United States Patent [19]

Smith

[11] 4,043,421

[45] Aug. 23, 1977

[54] AIR CAR

[76] Inventor: Lonnell E. Smith, 613 E. 51st Pl. N., Tulsa, Okla. 74126

[21] Appl. No.: 631,109

[22] Filed: Nov. 12, 1975

[51] Int. Cl.² ............................................. B60V 1/00
[52] U.S. Cl. .................................. 180/117; 416/168 R
[58] Field of Search ................ 180/116, 117; 416/136, 416/168, 164, 167, 189

[56] References Cited

U.S. PATENT DOCUMENTS

| | | | |
|---|---|---|---|
| 1,820,467 | 8/1931 | Liska | 416/168 |
| 2,953,321 | 9/1960 | Robertson et al. | 180/117 |
| 3,106,260 | 10/1963 | Bollum | 180/116 |
| 3,108,546 | 10/1963 | Hafner | 180/117 |
| 3,173,509 | 3/1965 | Wernicke et al. | 180/116 |
| 3,208,543 | 9/1965 | Crowley | 180/116 |
| 3,291,236 | 12/1966 | Foshag et al. | 180/116 |
| 3,548,969 | 12/1970 | Paull | 180/117 |
| 3,685,607 | 8/1972 | Eglen | 180/117 |

FOREIGN PATENT DOCUMENTS

| | | | |
|---|---|---|---|
| 940,779 | 12/1948 | France | 416/136 |
| 1,811,198 | 6/1969 | Germany | 180/117 |
| 1,026,810 | 4/1966 | United Kingdom | 180/117 |

*Primary Examiner*—Joseph F. Peters, Jr.
*Assistant Examiner*—Jack D. Rubenstein
*Attorney, Agent, or Firm*—William S. Dorman

[57] ABSTRACT

An air car capable of flying above the surface of the ground and above the ground-effect distance comprising a substantially rectangular frame structure defining a front end, a rear end, lateral side ends, a top and a bottom; a turbine engine mounted in the forward end of said vehicle and having an intake opening leading thereto at the forward end of said vehicle, a pair of rearwardly directed exhaust ports located adjacent the center of the rear of said vehicle and connected to the exhaust of said turbine, a pair of lateral exhaust openings adjacent the forward end of said vehicle and connected to the exhaust of said turbine, a pair of lateral exhaust ports located adjacent the rear of said vehicle and connected to the exhaust of said turbine, a pair of spaced fan assemblies mounted at the forward end of said vehicle and adjacent the sides thereof adapted to draw air from above said vehicle and force the same downwardly through openings at the bottom of said vehicle, a second pair of spaced fan assemblies mounted adjacent the rear of said vehicle and adjacent the sides thereof for drawing air from above the vehicle and forcing the same downwardly through openings at the bottom of said vehicle, means connected to the output of said turbine for driving said fan assemblies in unison, the fans adjacent one side of said vehicle rotating in a given rotary direction and the fans on the opposite side of said vehicle rotating in a direction opposite to said given rotary direction, each fan assembly including a plurality of horizontally and radially extending fan blades mounted for pivotal movement along a substantially horizontal pivot axis, each fan blade being pivotal around said horizontal pivot axis and means for pivoting the fan blades of all fan assemblies in unison, and means for selectively restricting the flow from the exhaust ports of each diagonally opposite pair of exhaust ports.

4 Claims, 7 Drawing Figures

AIR CAR

BACKGROUND OF THE INVENTION

1. Field of the Invention

The present invention relates to an air car capable of flying above the surface of the ground and, more particularly, to an air car capable of flying above the ground at a height greater than the ground-effect distance.

2. Description of the Prior Art

The existence of heavier-than-air vehicles capable of flying in the air is, of course, well known. Such vehicles include conventional airplanes with wings, helicopters and the like, and ground-effect vehicles. The prior art does not disclose an air car of the type disclosed herein capable of flying at substantial distances above the ground and controllable in a manner set forth below.

SUMMARY OF THE INVENTION

The present invention relates to an air car capable of flying above the surface of the ground and above the ground-effect distance that might normally be associate with a car of this same general type. The air car includes a substantially rectangular frame structure defining a front end, a rear end, lateral side ends, and a top and a bottom. The frame structure is covered with a skin of the same type which is used in the construction of conventional aircraft. A turbine engine is mounted in the forward end of the vehicle and an intake opening leading to the engine is provided at the forward end of the vehicle. A pair of rearwardly directed exhaust ports are located adjacent the center of the rear of the vehicle and connected to the exhaust of the turbine for providing forward thrust. A pair of lateral exhaust openings are located adjacent the forward end of the vehicle and are connected to the exhaust of the turbine. A second pair of lateral exhaust ports are located adjacent the rear of the vehicle and connected to the exhaust of the turbine. A pair of spaced fan assemblies are mounted at the forward end of the vehicle and adjacent the sides thereof for drawing air from above the vehicle and forcing the same downwardly through openings at the bottom of the vehicle. A second pair of spaced fan assemblies are mounted adjacent the rear of the vehicle and adjacent the sides thereof for drawing air from above the vehicle and forcing the same downwardly through openings at the bottom of the vehicle. Means are connected to the output of the turbine for driving the fan assemblies in unison. The fans adjacent one side of the vehicle rotate in a given rotary direction, for example, clockwise, and the fans on the opposite side of the vehicle rotate in an opposite rotary direction, for example, counterclockwise. Each fan assembly includes a plurality of horizontally and radially extending fan blades mounted for pivotal movement along a substantially horizontal pivot axis. Each fan blade is pivotal around this horizontal pivot axis or axle and means are provided for pivoting the fan blades of all fan assemblies in unison. For the purposes of steering the vehicle, means are provided for selectively restricting the flow from the exhaust ports of each diagonally opposite pair of exhaust ports.

DESCRIPTION OF THE PREFERRED EMBODIMENT

Figure 1:
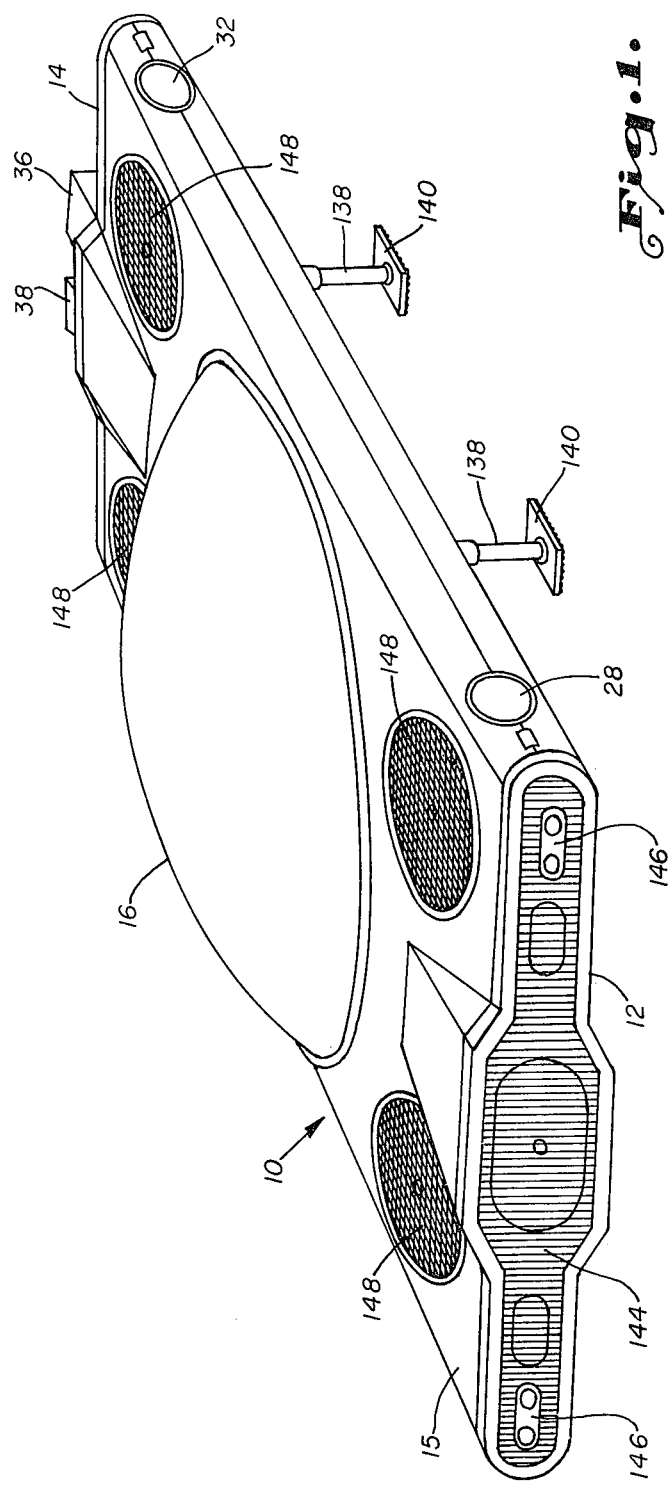
FIG. 1 is a top perspective view of the air car of the present invention.
Figure 2:
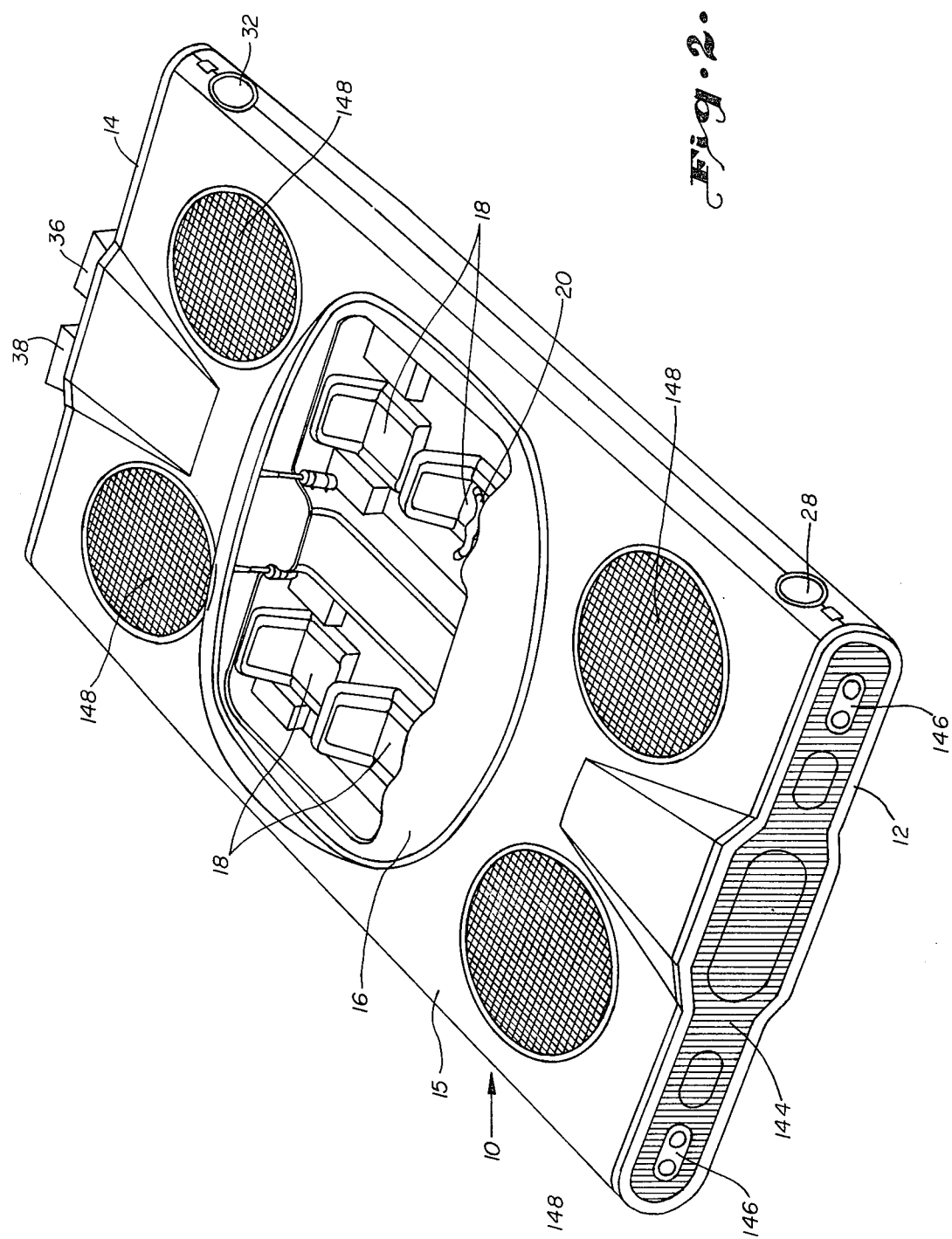
FIG. 2 is a perspective view similar to FIG. 1 showing the bubble top removed to reveal certain features of the interior of the air car.

Referring to the drawings in detail, FIG. 1 shows an air car 10, which is a heavier-than-air vehicle capable of rising into the air beyond the limits of a ground effect vehicle. The air car has a forward end 12 and a rear end 14. Except for the various openings which will be described hereinafter, the vehicle is covered by a skin 15 of the type normally employed in the outer covering for aircraft; as such, the outer covering 15 could be sheet aluminum, for example, or any other suitable conventional material. At the center of the top of the vehicle 10 there is a bubble top 16 which made of glass, plexi-glass or other suitable transparent material of the type normally employed in the construction of aircraft. The bubble top 16 is preferably mounted on the air car 10 by means of hinges or the like so that it can swing up and out of the way to permit operators and passengers to get into the air car and out. As shown in FIG. 2, where the bubble top has been removed, the interior of the car is provided with seats 18 for the operator and passengers and also a portion of the joystick 20 is shown.

Figure 3:
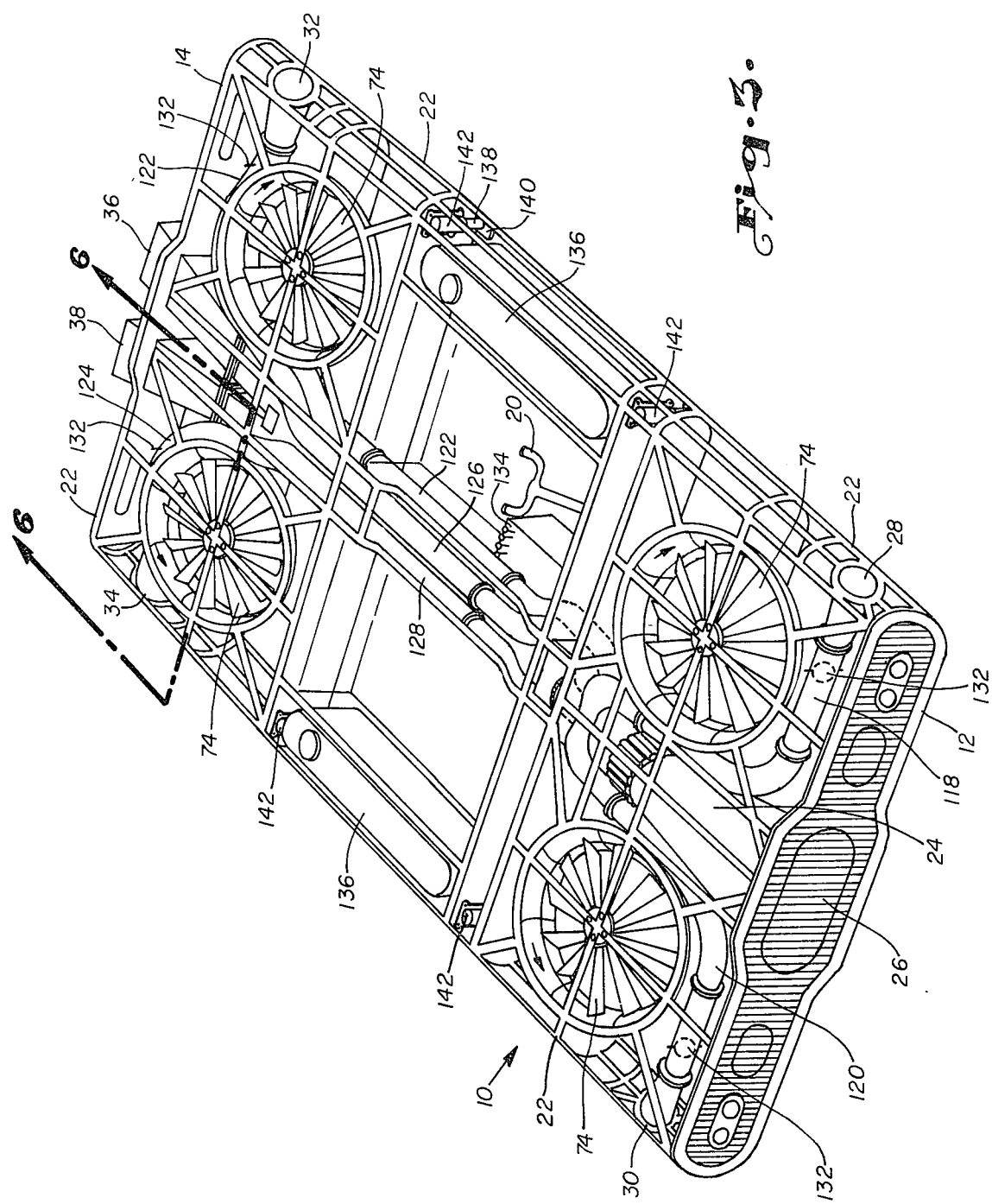
FIG. 3 is a view similar to FIG. 1 with the exterior covering of the air car removed showing the frame and the major components of the power system.

Turning now to a consideration of FIG. 3 which is a view of the vehicle with the skin 15 removed, the air car includes a frame structure 22 which is built in the fashion of frames for conventional aircraft. The various parts of the frame 22 are welded together or connected together in the customary fashion used in the construction of aircraft. Mounted within the frame is a prime mover 24 which is in the form of a turbine engine or jet motor. An opening 26 at the front end of the vehicle constitutes the intake for the engine 24 and the ports 28 and 30 at the forward end constitute two exhaust ports for the engine 24. Two additional exhaust ports 32 and 34 are located adjacent the rear of the air car 10 and two rear ports 36 and 38 are located at the rear end 14 of the car.

Figure 4:
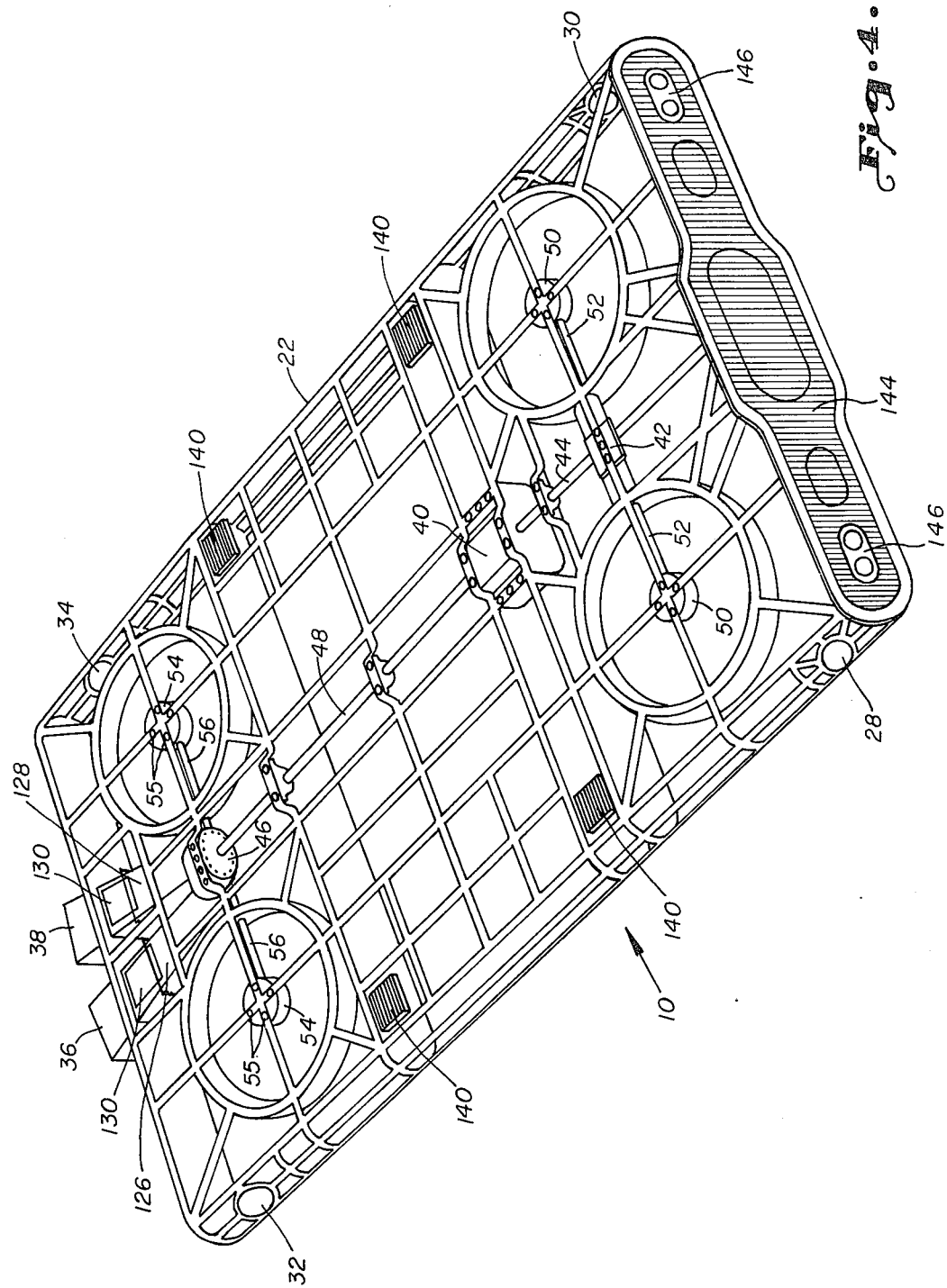
FIG. 4 is a reverse perspective from FIG. 3 showing the bottom of the air car with the exterior covering removed.
Figure 5:
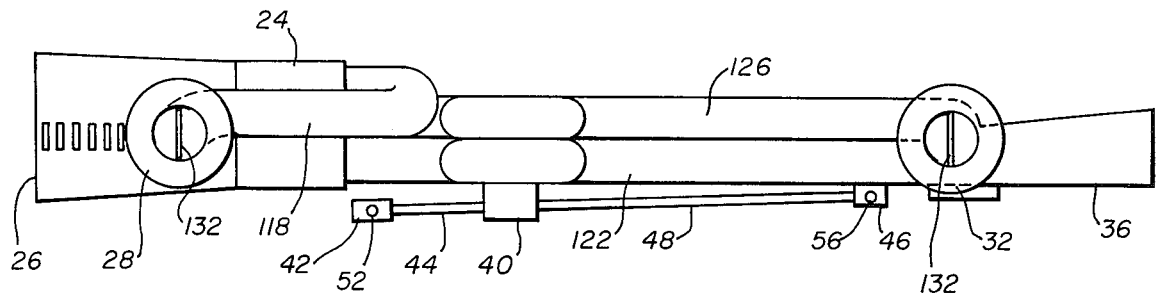
FIG. 5 is a side elevation of the main power unit and exhaust system used in the air car of the present invention.

The turbine engine 24 is provided with a conventional output shaft (not shown) which connects with a main gear box 40 (see now FIGS. 4 and 5). The main gear box 40 connects with a forward gear box 42 through a forward drive shaft 44. The main gear box 40 also connects with a rear gear box 46 through a rear drive shaft 48. The forward gear box 42 connects with forward gear housings 50 through forward transverse drive shafts 52. Similarly, the rear gear box 46 connects with rear gear housings 54 through rear transverse drive shaft 56.

Figure 6:
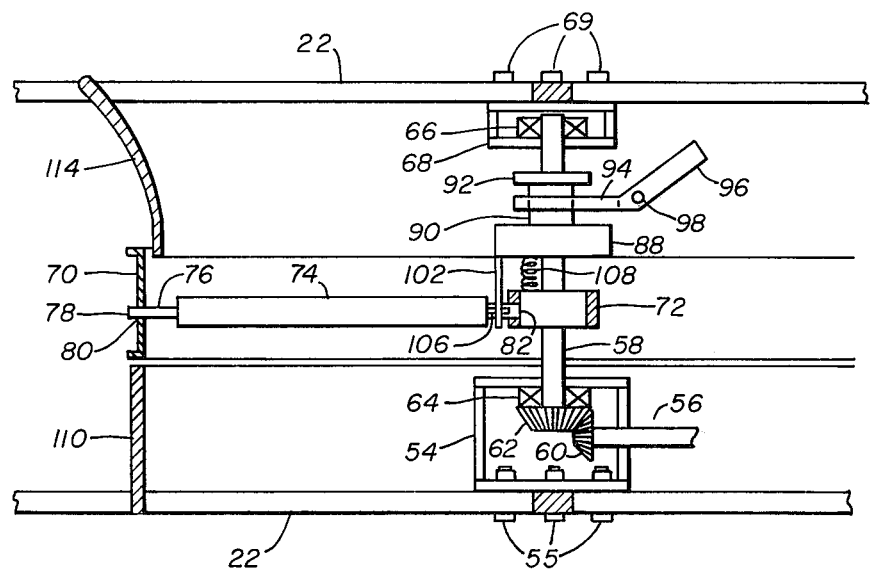
FIG. 6 is a fragmentary view taken along section line 6—6 of FIG. 3.
Figure 7:
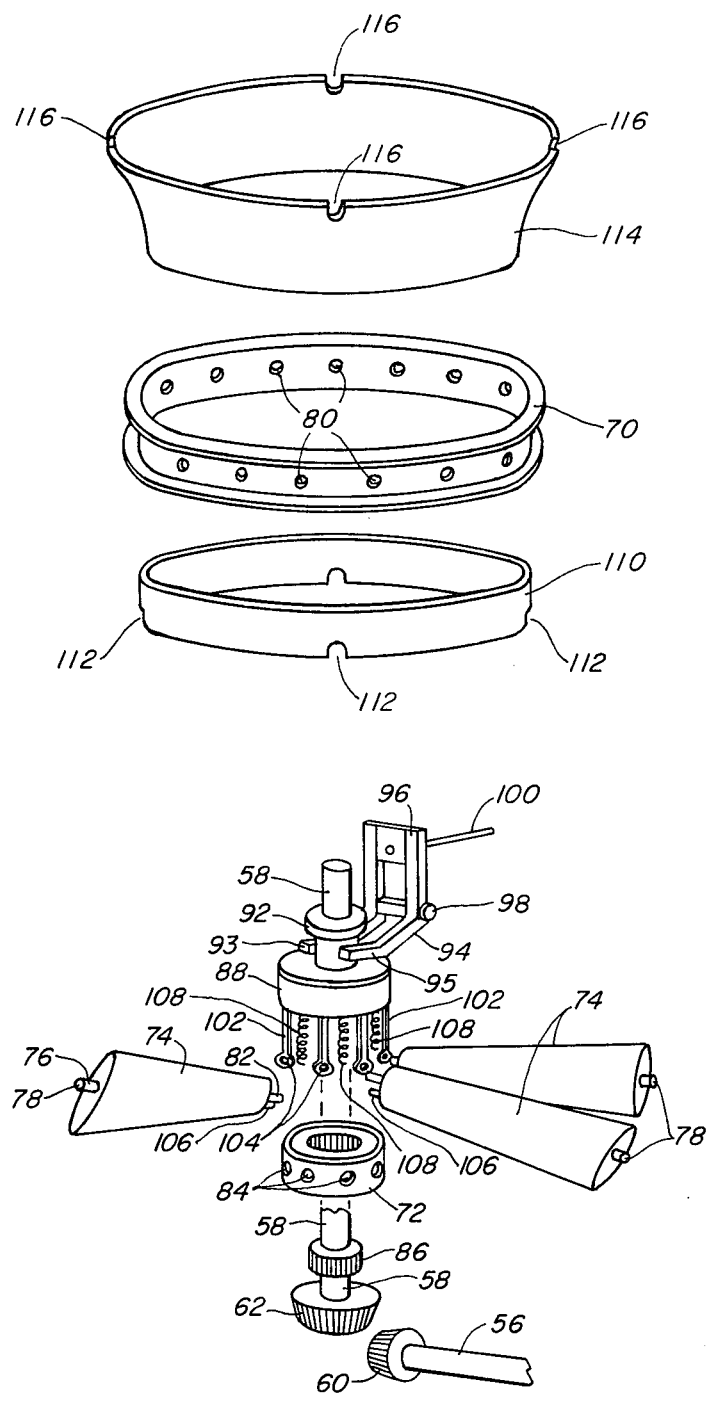
FIG. 7 is an exploded view of the elements shown in FIG. 6.

The air car is provided with four fan assemblies which will be described hereinafter in greater detail. For the purpose of describing these fan assemblies reference should be had to FIGS. 3, 6 and 7 which describe the right rear fan assembly as taken along section 6-6 of FIG. 3. The rear gear housing 54 is bolted to the frame 22 by means of the bolts 55. The shaft 56 is in driving relation with a vertical fan shaft 58; a bevel gear 60 at the end of the rear transverse drive shaft 56 meshes with a bevel gear 62 located at the lower end of the fan shaft 58. A lower bearing 64 is located on the shaft 58 between the bevel gear 60 and the top of the gear housing 54.

The upper end of the fan shaft 58 is provided with a bearing 66 which is received within an upper bearing housing 68, the latter being connected to the frame 22 by means of bolts 69, for example.

The fan portion, which will be described hereinafter and which is rotatable on the shaft 58, includes an outer hub 70, an inner hub 72, and a plurality of fan blades 74. Attention is also directed to FIG. 7 which shows the elements of FIG. 6 in an exploded relation. Each fan blade 74 has a central axle 76. Each axle 76 has an outer end 78 which is received in a hole or opening 80 in the outer hub 70 and an inner end 82 which is received in a hole 84 in the inner hub 72. The inner hub is placed in driving relation with the shaft 58 by means of the splined collar 86 which is mounted on the shaft 58.

A slidable collar 88 is mounted on the shaft 58 above the inner hub 72. The slidable collar 88 is provided with a reduced throat portion 90 which extends upwardly to an upper flange 92. A yoke 94 is provided with fingers 93 and 95 which fit around the reduced neck portion 90 between the main body of the collar 88 and the upper flange 92. The yoke 94 has an arm 96 which is attached to and extends upwardly from the yoke. At the point of connection between the arm 96 and the yoke 94 there is provided a pivot shaft 98 which is suitably mounted within the frame structure 22 in a conventional manner (not shown). A cable or link 100 is secured to the arm 96 so as to pivot the yoke 94 upwardly or downwardly around the pivot shaft 98 so as to lower or raise the collar 88.

A plurality of vertical rods 102 (one for each fan blade 74) projects vertically downward from the outer periphery of the collar 88. The lower end of each rod 102 is provided with a hole or opening 104 adapted to accommodate or receive therein a pin 106 on each fan blade which is spaced from the inner end 82 of the central axis 76 of the fan blade. Thus, when the slidable collar 88 is raised or lowered, the rods 102 will engage the pins 106 to cause the fan blades to turn in one direction or the other about their central axes 76. Springs 108 are provided between the lower surface of the collar 88 and the upper surface of the inner hub 72 to urge the collar 88 upwardly with respect to the hub 72. A lower shroud 110 which is stationary is disposed below the rotatable hub 80, and this shroud is provided with circular recesses 112 to fit over the adjacent cross members of the frame structure 22. The shroud 110 can be welded or otherwise connected to the frame structure 22. An upper shroud 114 is mounted above the outer hub 70 and is provided with circular recesses 116 so as to fit in the cross members of the frame structure 22. Again, the upper shroud 114 is connected to the frame structure 22 by welding or other suitable means. It should be noted that the upper shroud 114 has an upper and outward divergent contour and that the lower end of the shroud actually projects slightly into the interior of the outer hub 70 but spaced axially inwardly relative thereto.

Referring now to FIGS. 3 and 5, the forward exhaust port 28 connects with the main exhaust of the motor 24 by means of exhaust conduit 118. Likewise, the exhaust port 30 connects with the main exhaust of the engine 24 through exhaust conduit 120. Rear exhaust ports 32 and 34 connect with the main exhaust of the engine 24 through exhaust conduits 122 and 124, respectively. Rear exhaust ports 36 and 38 connect with the main exhaust of the engine 24 through exhaust ports 126 and 128, respectively.

Exhaust conduits 126 and 128 are provided with reversing vanes 130 which are movable into the exhaust conduits 126 and 128 in a conventional manner to provide a reverse or forward thrust in a conventional manner to slow down or stop the vehicle 10 whenever it is desired to do so.

Each of the exhaust conduits 118, 120, 122 and 124 is provided with a circular vane or damper 132 therein (see FIGS. 3 and 5) to close off the respective exhaust port 28, 30, 32 or 34. These vanes 132 are normally open or, in other words, disposed parallel to the direction of flow of the exhaust gases. However, the diagonal pairs of vanes 132 are operated in tandem to create a turning effect. That is, if it desired to turn the vehicle 10 towards the left, assuming that the vehicle was traveling in a forward direction, the vanes 132 adjacent the ports 28 and 34 would be at least partially closed so as to relatively increase the thrust from the other diametrically opposite ports 30 and 32; this effect would cause the car 10 to swing towards the left. To turn the car in the opposite direction, the vanes adjacent the other diametrically opposed ports 30 and 32 would be turned towards a partially closed condition so as to increase the thrust out of the ports 28 and 34.

As shown in FIG. 3, a control console 134 is provide adjacent the joystick 20. The control console would include various levers, buttons, meters, etc., as would be conventional in connection with all types of aircraft. A pair of fuel tanks 136 are located along the sides in the interior of the air car 10. In order to support the car 10 in a position above the ground for takeoff or landing, four legs 138 are provided, two of which are shown in FIG. 1. A flat foot 140 is mounted on the lower end of each leg 138 and the upper end of each leg engages a hydraulic cylinder 142, for the purpose of lowering or elevating the legs 138. It should be understood that the air car includes one or more conventional hydraulic pumps (not shown) which are connected by conventional hydraulic circuitry (not shown) to the various mechanisms such as the hydraulic cylinders 140 which operate off the hydraulic circuit. These hydraulic pumps are connected by a suitable offtake (not shown) from the main gear box 40. Furthermore, the various yokes 94 are operated by means of suitable controls as are the vanes 130 and the vanes 132.

The forward end of the air car is provided with a front screen 144 to which is attached a pair of headlight consoles 146. Fan screens 148 are provided above the fan openings over the upper openings of the shrouds 114.

Referring now to FIG. 3, in operation, the fans on the left side of the vehicle (on the right side of FIG. 3) rotate in a clockwise direction whereas the fans on the right side rotate in a counterclockwise direction. To increase the lift, fan blades 74 are turned to a relatively more vertical position where they "bite" more into the air. When it is desired to lower the vehicle, the fan blades 74 are turned to a more nearly horizontal disposition. The fan assemblies are designed to operate at the same rotary speed and the blades 74 of all fans are designed to turn or rotate on their axes 74 simultaneously in the same direction and to the same degree. The gear ratios in the main gear box 40, the forward gear box 42, the rear gear box 46 are so related to the normal operating range of the engine 24 that the fan blades are rotated at such a speed that the vehicle 10 will rise above the ground beyond the normal ground effect range so that the vehicle 10 can fly at any desired distance above the ground.

Whereas the present invention has been described in particular relation to the drawings attached hereto, it should be understood that other and further modifications, apart from those shown or suggested herein, could be made within the spirit and scope of this invention.

What is claimed is:

1. A vehicle capable of flying above the surface of the ground above the ground effect distance comprising a substantially rectangular frame structure defining a front end, a rear end, lateral side ends, a top and a bottom; a turbine engine mounted in the forward end of said vehicle and having an intake opening leading thereto at the forward end of said vehicle, a pair of rearwardly directed exhaust ports located adjacent the center of the rear of said vehicle and connected to the exhaust of said turbine, a pair of lateral exhaust openings adjacent the forward end of said vehicle and connected to the exhaust of said turbine, a pair of lateral exhaust ports located adjacent the rear of said vehicle and connected to the exhaust of said turbine, a pair of spaced fan assemblies mounted at the forward end of said vehicle and adjacent the sides thereof adapted to draw air from above said vehicle and force the same downwardly through openings at the bottom of said vehicle, a second pair of spaced fan assemblies mounted adjacent the rear of said vehicle and adjacent the sides thereof for drawing air from above the vehicle and forcing the same downwardly through openings at the bottom of said vehicle, means connected to the output of said turbine for driving said fan assemblies in unison, the fans adjacent one side of said vehicle rotating in a given rotary direction and the fans on the opposite side of said vehicle rotating in a direction opposite to said given rotary direction, each fan assembly including a plurality of horizontally and radially extending fan blades mounted for pivotal movement along a substantially horizontal pivot axis, each fan blade being pivotal around said horizontal pivot axis and means for pivoting the fan blades of the fan assemblies, and means for selectively restricting the flow from the exhaust ports of each diagonally opposite pair of exhaust ports, each fan assembly including a substantially vertical fan shaft, an inner hub mounted on said fan shaft, an outer hub spaced from said inner hub, each fan blade having an axle, one end of said axle being received in an opening in the inner hub and the opposite end of said axle being received in an opening in said outer hub, a yoke slidably mounted on said fan shaft above said inner hub, said yoke having a plurality of vertical rodes extending downwardly therefrom, each rod having an opening adjacent the lower end thereof, a pin received on the inner end of each fan blade adjacent the inner end of the axle thereof, each pin being adapted to be received in an opening at the lower end of an adjacent vertical rod, whereby, upon vertical reciprocation of said yoke, all of said fan blades can be turned around their axles in unison, and operator means for moving said yoke upwardly and downwardly along said fan shaft.

2. A vehicle as set forth in claim 1 including a plurality of springs mounted between said inner hub and said yoke for urging said yoke upwardly away from said inner hub.

3. A vehicle as set forth in claim 2 wherein each fan assembly includes a cylindrical and stationary shroud mounted below said outer hub and in communication with one of the openings at the bottom of the vehicle, an upper stationary shroud mounted above said outer hub for drawing air from above said vehicle, said upper shroud having an upper and outward divergent contour with the lower end of said upper shroud projecting slightly into the interior of said outer hub.

4. A vehicle as set forth in claim 3 including a plurality of telescopically retractable legs mounted on the bottom of said vehicle for supporting said vehicle above the ground.

* * * * *